United States Patent
Wortham et al.

(10) Patent No.: US 7,834,598 B1
(45) Date of Patent: Nov. 16, 2010

(54) THERMALLY OPTIMIZED ARCHITECTURE FOR SWITCHING REGULATORS

(75) Inventors: Jason Allen Wortham, Fremont, CA (US); Turev Dara Acar, Mountain View, CA (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 42 days.

(21) Appl. No.: 12/328,643

(22) Filed: Dec. 4, 2008

Related U.S. Application Data

(60) Provisional application No. 61/016,357, filed on Dec. 21, 2007.

(51) Int. Cl.
*G05F 1/613* (2006.01)
*G05F 1/00* (2006.01)

(52) U.S. Cl. .............. 323/224; 323/283; 323/285; 323/299; 323/907

(58) Field of Classification Search ........... 323/224, 323/283, 285, 299, 907
See application file for complete search history.

(56) References Cited

U.S. PATENT DOCUMENTS

| | | | |
|---|---|---|---|
| 6,628,109 B2* | 9/2003 | Rincon-Mora | 323/282 |
| 6,894,465 B2* | 5/2005 | Sutardja et al. | 323/268 |
| 7,298,124 B2* | 11/2007 | Kan et al. | 323/283 |
| 7,622,904 B2* | 11/2009 | Sutardja et al. | 323/282 |
| 7,646,189 B2* | 1/2010 | Chen | 323/285 |

OTHER PUBLICATIONS

"LM138, LM338 5-Amp Adjustable Regulators", *National Semiconductor Corporation*, (Mar. 1995), pp. 1-14.

* cited by examiner

*Primary Examiner*—Shawn Riley
(74) *Attorney, Agent, or Firm*—Blakely Sokoloff Taylor & Zafman LLP

(57) ABSTRACT

In a preferred embodiment for use in step-down (buck) DC-DC converters that may operate, at least part of the time, at high duty cycles (>50%), the power dissipation in the high side switch is effectively monitored and the switching frequency of the converter is lowered as needed to keep the sum of the conduction losses and switching losses in the high side switch substantially constant. In another embodiment, the ideal switching frequency is approximated. In still another embodiment having the switches integrated with the controller, the die temperature is monitored, and switching frequency, output current or both are varied to limit the die temperature.

20 Claims, 8 Drawing Sheets

THERMALLY OPTIMIZED ARCHITECTURE FOR SWITCHING REGULATORS

CROSS-REFERENCE TO RELATED APPLICATION

This application claims the benefit of U.S. Provisional Patent Application No. 61/016,357 filed Dec. 21, 2007.

BACKGROUND OF THE INVENTION

1. Field of the Invention

The present invention relates to the field of switching regulators.

2. Prior Art

Switching regulators such a buck converters provide an efficient way of converting a source voltage to a lower and regulated output voltage. However there are losses in such converters that determine the component requirements for such converters. The primary losses are in the switching transistors, and for a duty cycle in excess of 50%, the primary losses are in the high side switching transistor N1 of a typical buck switching regulator, shown in FIG. 1. This is true whether the switches N1 and N2 are on the controller chip, or are discrete devices.

Conventional buck converters are designed to operate at a fixed switching frequency, and accordingly are designed for the worst case of operating conditions for that frequency. In a typical application, there will be a maximum current requirement for a given output voltage and input voltage or input voltage range. Failure to satisfy these requirements may cause a system powered at least in part by the buck converter to overheat, malfunction, shutdown or reset.

In a battery charger, the requirements are not as severe, in that a dip in the output current of a battery charger will only cause an extension of the battery charging time to full charge.

DETAILED DESCRIPTION OF THE PREFERRED EMBODIMENTS

A preferred embodiment of the present invention is a new type of control system for use in step-down (buck) DC-DC converters that may operate, at least part of the time, at high duty cycles (>50%). In this new architecture, the switching frequency is adjusted to control the power dissipation in the high side power switch. The adjustment in the switching frequency reduces the capacitance, inductance and power switch requirements, thereby reducing cost and PCB area.

Figure 1:
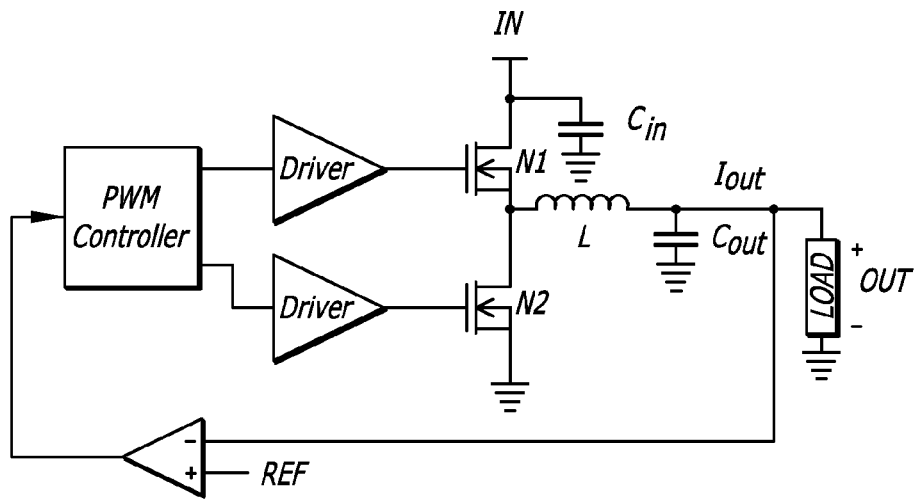
FIG. 1 illustrates a typical prior art buck switching regulator.
Figure 2:
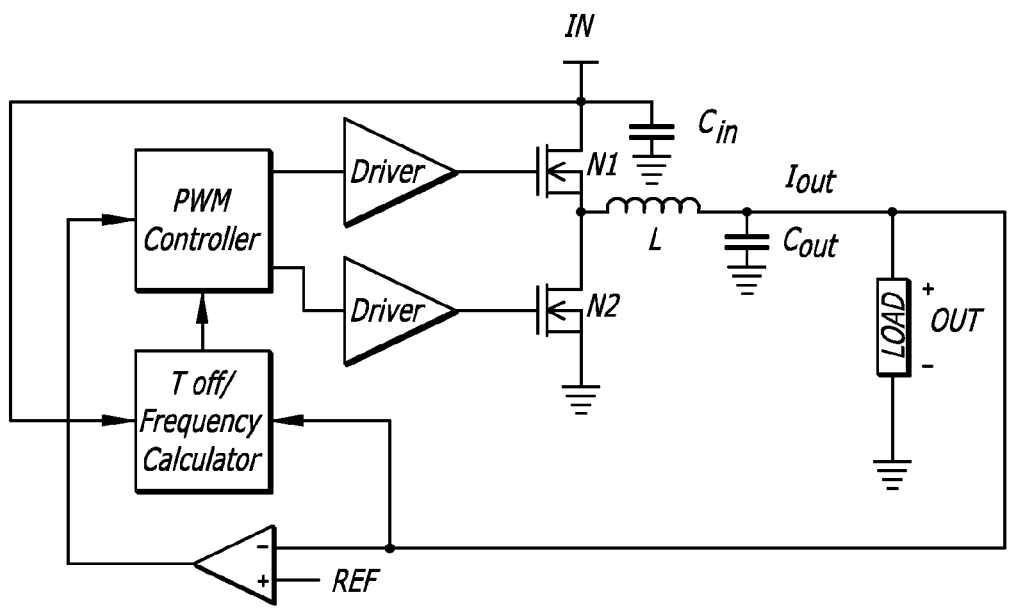
FIG. 2 illustrates one embodiment of the present invention.

In one embodiment as illustrated in FIG. 2, the invention determines the off-time duration of the high side power switch of a step-down DC-DC converter to keep the power dissipation in the power switch constant. As pointed out before, in a regular buck converter, such as in FIG. 1, whether the switches N1 and N2 are on-chip or not, the two major heat contributors for the high side power switch, N1, are conduction loss and switching loss. Thus even if discrete devices for the switches N1 and N2 are used, in a high duty cycle charger, switch N1 still must be protected against overheating in accordance with the ambient temperature it will be subjected to and its package thermal resistance. If integrated with the controller, the same requirement applies. The primary losses for the switch N1 in a high duty cycle converter are:

Conduction Loss:

$$PD_{COND} = \frac{V_{OUT}}{V_{IN}} \cdot I_{OUT}^2 \cdot RDS(ON)$$

Switching Loss:

$$PD_{SW} = \frac{1}{2} \cdot t_{Trans} \cdot V_{IN} \cdot I_{OUT} \cdot f_{SW},$$

where:
 $V_{IN}$: Input voltage
 $V_{OUT}$: Output voltage
 $I_{OUT}$: Output current
 $R_{DS(ON)}$: The resistance of N1 when it is turned on
 $t_{Trans}$: Time to turn on/off the N1
 $f_{SW}$: Switching frequency of the controller $$PD_{TOTAL} = PD_{COND} + PD_{SW} = \frac{V_{OUT}}{V_{IN}} \cdot I_{OUT}^2 \cdot RDS(ON) + \frac{1}{2} \cdot t_{Trans} \cdot V_{IN} \cdot I_{OUT} \cdot f_{SW}$$

where: $PD_{MAX}$ is the maximum power dissipation for the power switch based upon its die size and the package's thermal resistance. If the power switches are integrated, $PD_{Max}$ is the maximum power dissipation for the controller package. Otherwise, Once $PD_{MAX}$ is defined, it is used as a reference level for the regulator. The controller adjusts the switching frequency and/or output current such that the dissipation in the die is at $PD_{MAX}$. The optimal utilization requires the total power loss to be constant at $PD_{TOTAL}=PD_{MAX}$ in all operating regions. Solving the above equations for the frequency $f_{SW}$ to hold $PD_{MAX}$ constant under a particular set of operating conditions, the optimum frequency is:

$$f_{SW} = k_1 \cdot \frac{1}{V_{IN}} - k_2 \cdot \frac{V_{OUT}}{V_{IN}^2}$$

where: $k_1$ and $k_2$ are constants as follows:

$$k_1 = \frac{2 \cdot PD_{MAX}}{t_{Trans} \cdot I_{OUT}}$$

$$k_2 = \frac{2 \cdot I_{OUT} \cdot R_{DS(ON)}}{t_{Trans}}$$

The optimum frequency for a given $PD_{MAX}$ is a function of $V_{IN}$ and $V_{OUT}$, as well as the switching speed of the switch N1 and its resistance when turned on.

Figure 3:
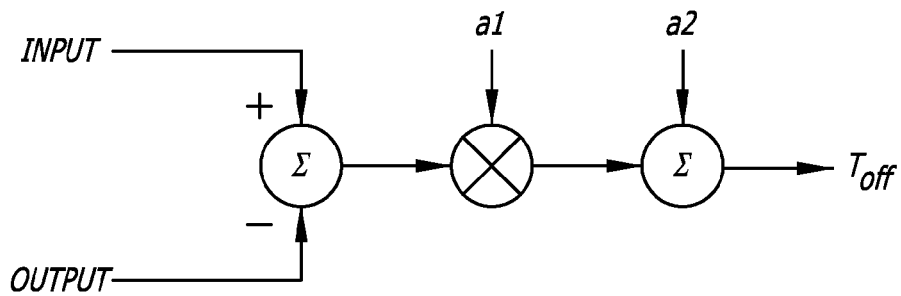
FIG. 3 illustrates a simple computational network for determining $t_{OFF}$.

For the external power switch case, a simplified implementation (approximation) is done by modifying the off time duration of the high side power switch. The $t_{OFF}$/frequency calculator block in FIG. 2 can be implemented with the simple computational network shown in FIG. 3, where $t_{OFF}=a1\cdot(V_{IN}-V_{OUT})+a2$. The optimum coefficients, a1 and a2, can be calculated with an optimization algorithm and hardwired into the regulator. An example is: a1=0.0225 and a2=0.2. a1 and a2 are gain factors, and alternatively could be made externally adjustable. Extending the off time reduces the switching rate of the high side switch, as a longer off time of the switch leads to a longer on time to build inductor current again.

Figure 5A:
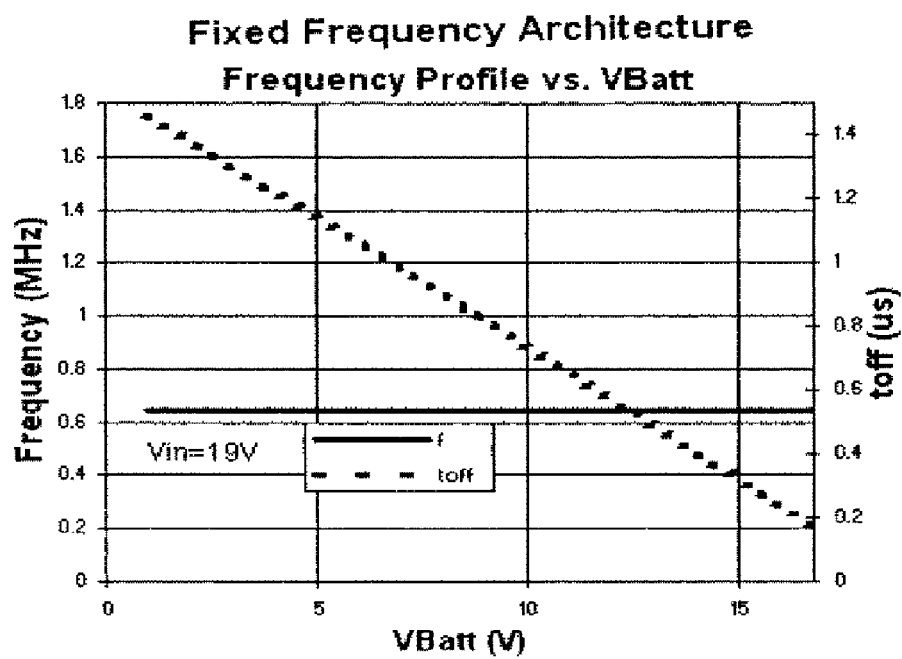
FIGS. 5a through 5i illustrate operating characteristics for converters with a fixed frequency architecture, with an ideal full thermal utilization architecture (i.e. considering all losses) and with an approximate full thermal utilization architecture.
Figure 5B:
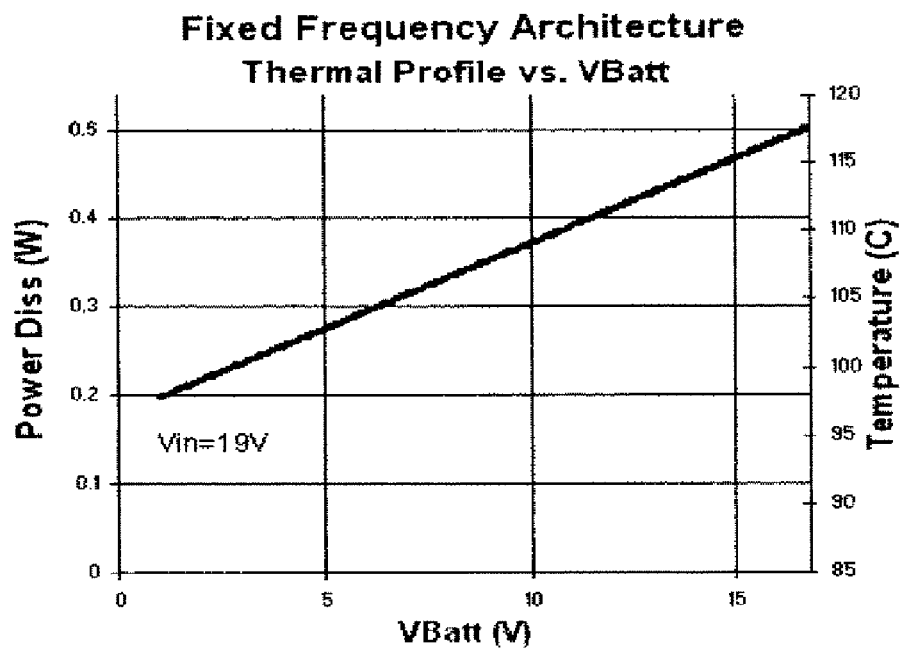
Figure 5C:
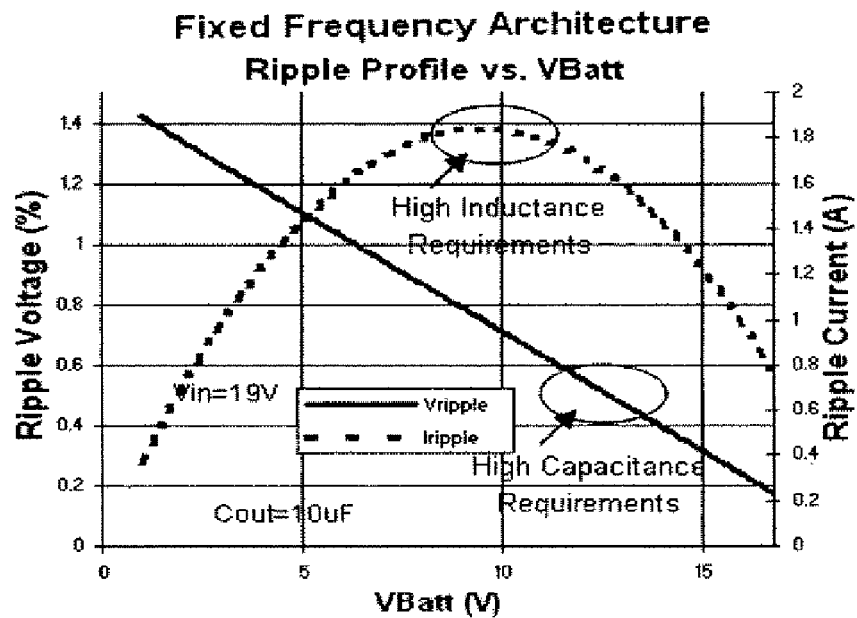
Figure 5D:
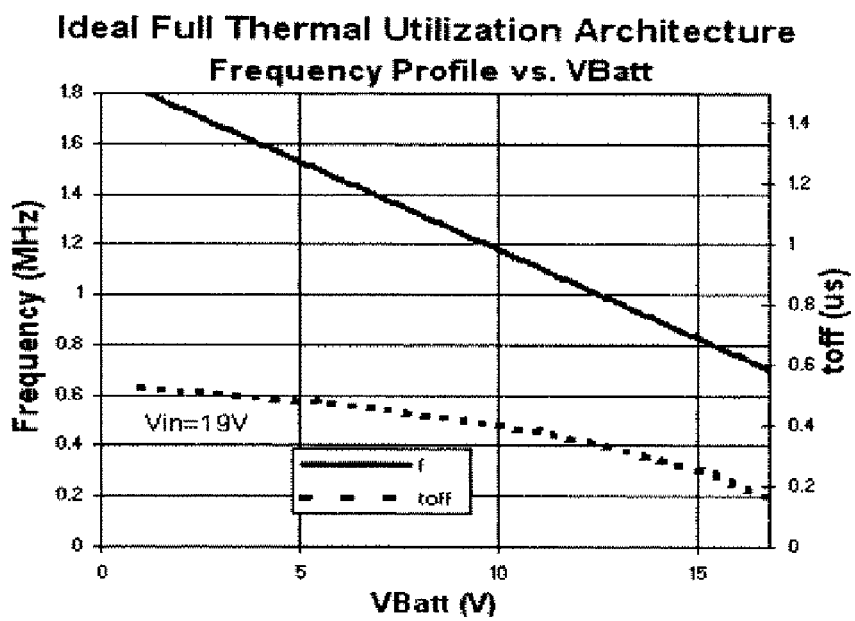
Figure 5E:
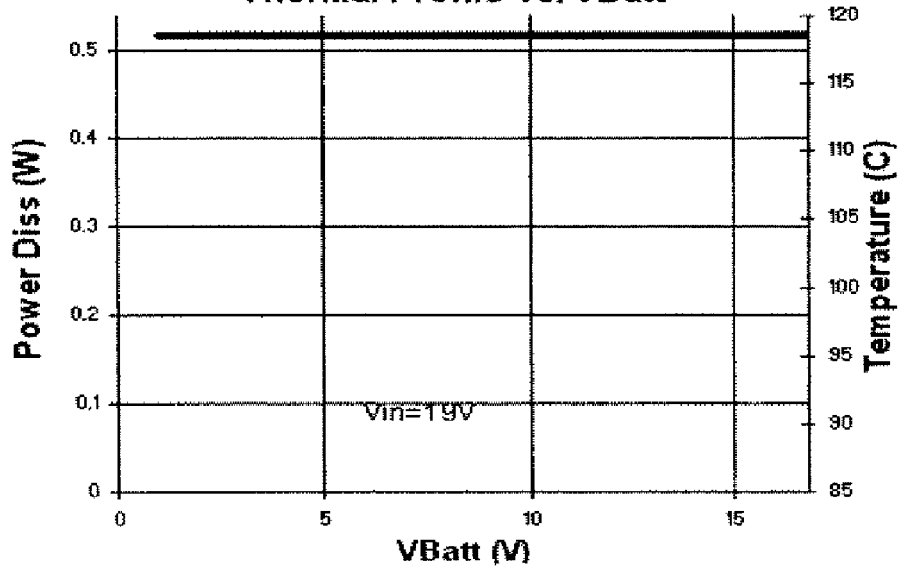
Figure 5F:
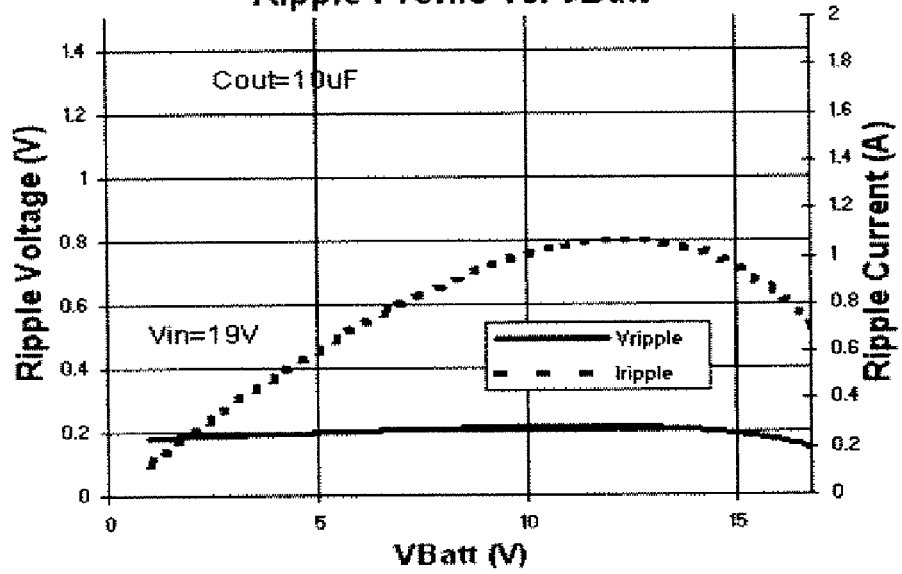
Figure 5G:
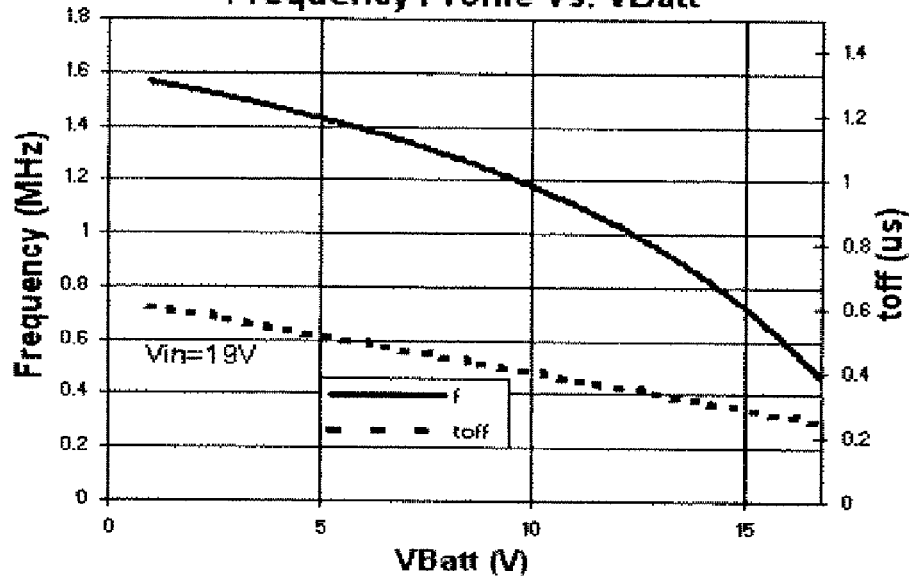

FIGS. 5a, 5d and 5g show $t_{OFF}$ variation with respect to battery (charger output) voltage at $V_{IN}$=19V for a converter with a fixed frequency architecture, a converter with an ideal full thermal utilization architecture (i.e. considering all losses) and a converter with an approximate full thermal utilization architecture as in the present invention, respectively. For a converter with a fixed frequency architecture (FIG. 5a), the $t_{OFF}$ time decreases linearly. For a converter with an ideal full thermal utilization architecture (FIG. 5d), the $t_{OFF}$ time is much more constant, trailing off at higher output voltages. For a converter with an approximate full thermal utilization architecture as in the present invention, the $t_{OFF}$ time has a more uniform slope than the ideal, which slope is much less than for the fixed frequency architecture.

Figure 4B:
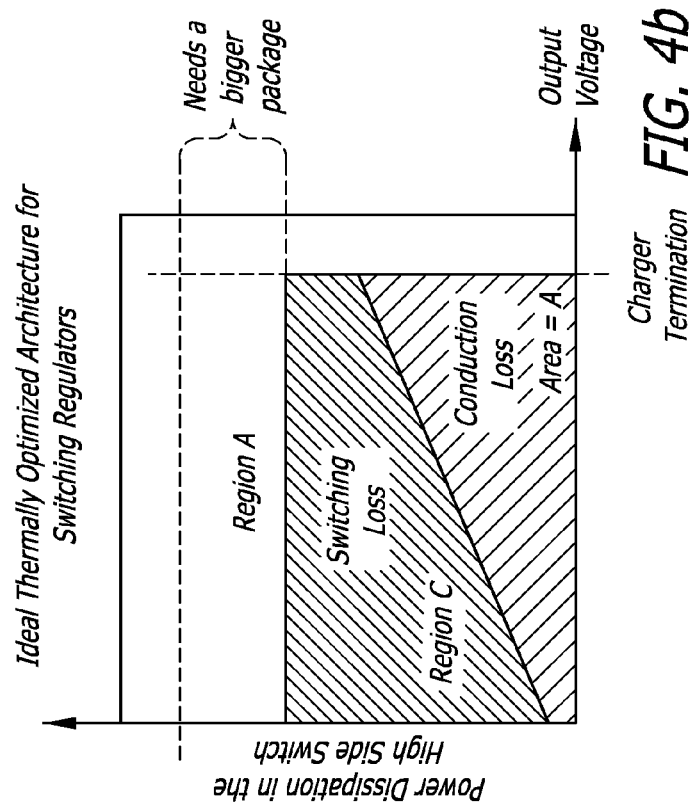
FIGS. 4a and 4b illustrate switching losses and conduction losses for a prior art fixed frequency converter and for a converter in accordance with the present invention.
Figure 4A:
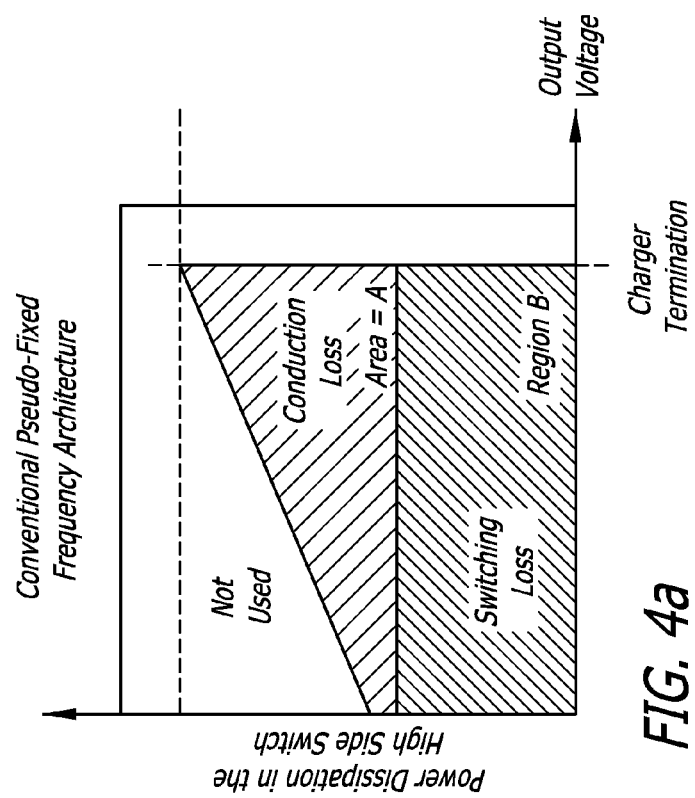

FIGS. 4a and 4b provide a visual comparison of the power dissipation in the high side switch for a conventional pseudo fixed frequency regulator versus a thermally optimized regulator, respectively, both operating at a constant input voltage and output current. For the conventional fixed frequency approach (FIG. 4a), the switching loss is constant, but the total power dissipation increases as a function of output (battery) voltage because of the increasing conduction loss with output voltage. The result is that the maximum thermal capability of the switch is not utilized at low output voltages. For the thermally optimized architecture (FIG. 4b), the power dissipation is constant with respect to output voltage. This is achieved by reducing the switching losses by reducing the frequency as the conduction losses increase, thereby making the sum of the two losses constant throughout the output voltage range. By design, the power dissipation can be set to the package's maximum rating, thereby making the most efficient use of the power switch N1. In both Figures, the areas A for the conduction losses are the same. Region B in FIG. 4a is fixed as the output voltage changes for the fixed frequency architecture, whereas Region C in FIG. 4b is shrinking with increasing output voltage for the thermally optimized architecture.

Region A in FIG. 4b, the reduction in actual power dissipation for a given input voltage and output current, can allow any of the following, separately or together:

1. To use a cheaper and smaller package power switch in the high side=>Region A is blank.
2. To switch faster to shrink the output capacitor and inductor=>Region A is filled with switching losses.
3. To supply more current to the output=>Region A is filled with conduction losses.

The output capacitor should be selected to force the output voltage ripple to be less than 1% of the rated output voltage. It is reasonable to decrease the switching frequency to make the output voltage ripple constant when the output voltage goes up.

Figure 5H:
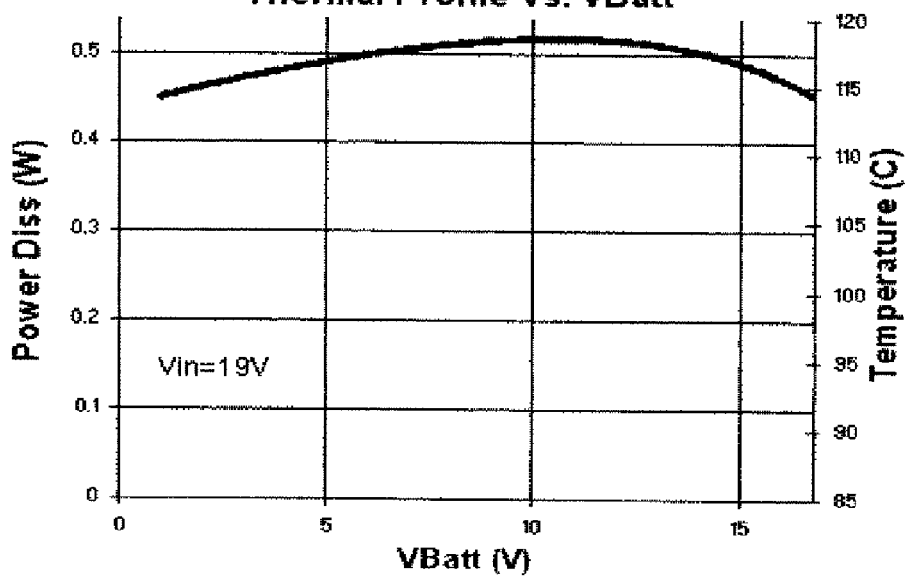
Figure 5I:
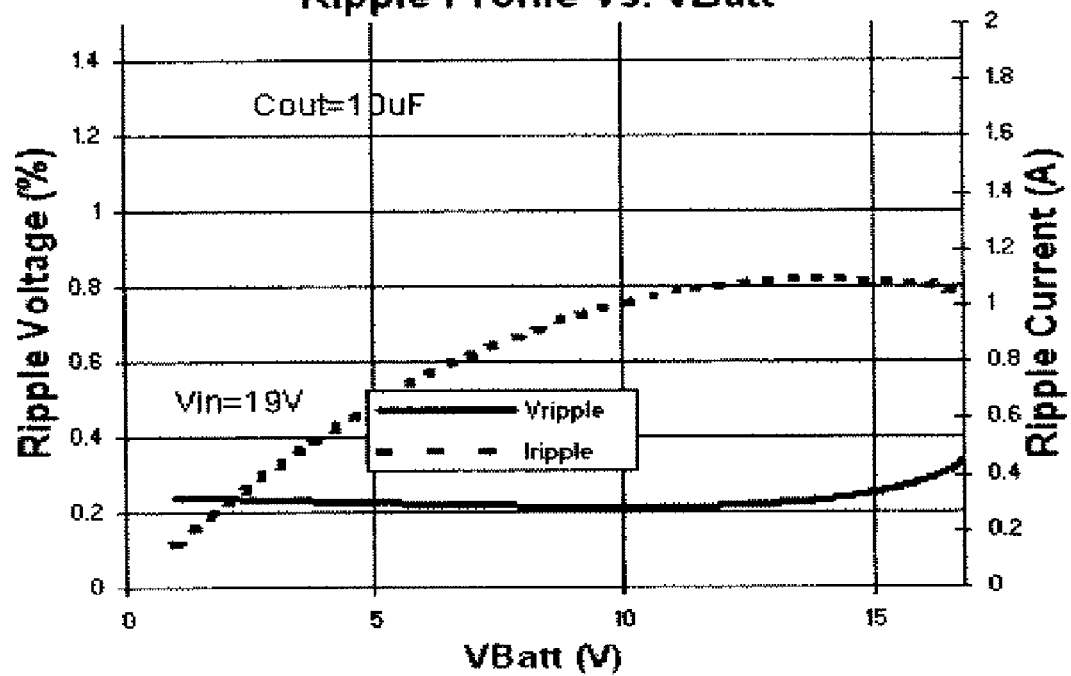

FIGS. 5b, 5e and 5h show the thermal profile of switch N1 for a conventional fixed frequency architecture, ideal thermally optimized architecture, and a practical realization of thermally optimized architecture in accordance with the present invention, respectively. FIGS. 5c, 5f and 5i show the ripple voltage and ripple current of a charger having the same inductor and output capacitor for a conventional fixed frequency architecture, ideal thermally optimized architecture, and a practical realization of thermally optimized architecture in accordance with the present invention, respectively.

The internal power switch version of the architecture allows higher typical power delivery compared to the guaranteed power deliverable. For charger applications this allows higher charge current for >90% of the operation, yet still protects the IC when the ambient temperature is high. Also this architecture reclaims much of the design margin lost in a normal architecture.

Thus the advantages of the present invention include:

a. $t_{OFF}$ control for the most efficient thermal utilization of the high-side MOSFET b. Frequency control for the most efficient thermal utilization of the high-side MOSFET c. Thermal control to minimize inductor and capacitor requirements Benefits of the new architecture:

1. Easy to implement in analog integrated circuits.
2. The switching frequency is optimized to keep the power dissipation in the high side power switch constant. The high side power switch is, therefore, utilized efficiently for all operating conditions.
3. The bill-of-materials cost, such as the high side power switch, inductor, and output capacitor is lower than the cost of competing solutions.
4. The total board space is significantly reduced.
5. The efficiency of a battery charger is higher than the competing solutions.
6. For an internal power switch implementation, the DC-DC converter adjusts the switching frequency to optimize operation for a given output capacitor and inductor.
7. The internal power switch DC-DC converter delivers the maximum current for a given package thermal resistance.

While this architecture is targeted for use in battery chargers, it can be applied to many different DC-DC converters that operate at high duty cycles. The invention can be also used in any kind of step-down DC-DC converter, where the power switches are integrated.

Figure 6:
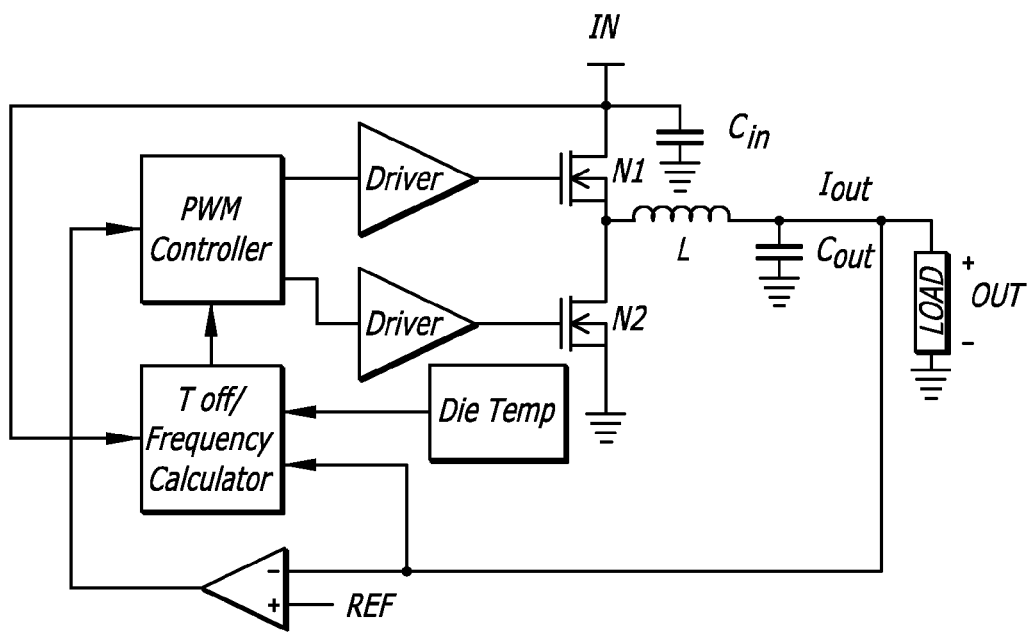
FIG. 6 illustrates an embodiment of switching regulator with the power switches integrated in the controller.

If the power switches are integrated in the controller, the output current can be adjusted based on the thermal capacity of the IC package. Using an on-chip thermal measurement as in FIG. 6, when the IC package reaches its upper temperature limit, the controller's frequency and/or the output current can be decreased. By way of example, one might choose to reduce the frequency below the controller's normal switching frequency when the thermal limit is reached, and then to lower the current when a lower limit on the switching frequency is reached. In this way, the device optimizes itself based on junction temperature when needed. This approach allows much higher available output current than the worst-case analysis would suggest. Conventional thermal design margin no longer constrains the actual current limit.

In the embodiments disclosed herein, the high side switches N1 and low side switches N2 have been shown as field effect devices. Obviously other types of transistor switches could be used as desired, such as bipolar switches. If desired, the low side switch could be a diode, as a diode will conduct and not conduct (turn on and off) as required for such application, though use of a diode is not preferred because of the power loss therein due to its forward conduction voltage drop.

Also with respect to the control of the low side switch N2, when the switching regulator is operating at or near its maximum output current, the current in the inductor does not go to zero between on times of the high side switch N1. Consequently the low side switch is simply turned off when the high side switch N1 is on, and turned on when the high side switch N1 is off. When not operating at or near its maximum output current, the current in the inductor does go to zero between on times of the high side switch N1, in which case the low side switch is turned off when the inductor current goes to zero as per the prior art, and remains off until the high side switch is again turned on and off.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a step down converter having a high side transistor switch and a low side transistor switch comprising:
   sensing an input voltage;
   sensing an output current;
   sensing an output voltage; and,
   adjusting a switching rate of the transistor switches so that the sum of conduction losses and switching losses in the high side transistor switch is substantially constant, independent of the output voltage.

2. The method of claim 1 wherein the high side and low side transistor switches are discrete devices.

3. The method of claim 1 wherein the high side and low side transistor switches, together with a step down converter controller, are in a single integrated circuit.

4. The method of claim 3 wherein the high side transistor switch is a field effect transistor.

5. The method of claim 4 wherein the high side and low side transistor switches are field effect transistors.

6. The method of claim 1 wherein the switching rate of the transistor switches is adjusted so that the switching rate has a frequency $f_{SW}$ of approximately $$f_{SW} = k_1 \cdot \frac{1}{V_{IN}} - k_2 \cdot \frac{V_{OUT}}{V_{IN}^2}$$

where: $k_1$ and $k_2$ are the constants $$k_1 = \frac{2 \cdot PD_{MAX}}{t_{Trans} \cdot I_{OUT}}$$

$$k_2 = \frac{2 \cdot I_{OUT} \cdot R_{DS(ON)}}{t_{Trans}}$$

and:
$PD_{max}$ is the maximum power dissipation for the high side switch;
$t_{trans}$ is the switching time of the high side switch
$V_{in}$ is the input voltage of the step down converter
$V_{OUT}$ is the output voltage of the step down converter
$I_{OUT}$ is the output current of the step down converter
$R_{ds(on)}$ is the resistance of the top side switch when on.

7. A method of operating a step down converter having a high side and low side transistor switches and a step down converter controller in a single integrated circuit die comprising:
   lowering a switching frequency of the transistor switches when the die temperature reaches an upper temperature limit and the switching frequency is above a lower switching frequency limit; and
   lowering an output current of the step down converter when the switching frequency reaches the lower switching frequency limit.

8. A method of operating a step down converter having discrete high side and low side field effect transistor switches comprising:
   sensing an input voltage to the step down converter;
   sensing an output current of the step down converter;
   sensing an output voltage of the step down converter; and,
   adjusting a switching rate of the transistor switches so that the switching rate has a frequency $f_{SW}$ of approximately $$f_{SW} = k_1 \cdot \frac{1}{V_{IN}} - k_2 \cdot \frac{V_{OUT}}{V_{IN}^2}$$

where: $k_1$ and $k_2$ are the constants $$k_1 = \frac{2 \cdot PD_{MAX}}{t_{Trans} \cdot I_{OUT}}$$

$$k_2 = \frac{2 \cdot I_{OUT} \cdot R_{DS(ON)}}{t_{Trans}}$$

and:
$PD_{max}$ is the maximum power dissipation for the high side switch;
$t_{trans}$ is the switching time of the high side switch
$V_{in}$ is the input voltage of the step down converter
$V_{OUT}$ is the output voltage of the step down converter
$I_{OUT}$ is the output current of the step down converter
$R_{ds(on)}$ is the resistance of the top side switch when on.

9. The method of claim 8 wherein the high side and low side transistor switches are discrete devices.

10. The method of claim 8 wherein the high side and low side transistor switches, together with a step down converter controller, are in a single integrated circuit.

11. The method of claim 8 wherein the high side transistor switch is a field effect transistor.

12. The method of claim 8 wherein the high side and low side transistor switches are field effect transistors.

13. A method of operating a step down converter having a high side transistor switch and a low side transistor switch comprising:
   sensing an input voltage;
   sensing an output voltage; and,
   adjusting a switching rate of the transistor switches so that the sum of conduction losses and switching losses in the high side transistor switch is substantially constant, independent of the output voltage.

14. The method of claim 13 wherein the switching rate of the transistor switches is adjusted by adjusting the off time $t_{OFF}$ of the high side switch.

15. The method of claim 13 wherein the switching rate of the transistor switches is adjusted by adjusting the off time $t_{OFF}$ of the high side switch so that $t_{OFF}=a1(V_{IN}-V_{OUT})+a2$, where a1 and a2 are constants.

16. A method of operating a step down converter having a high side transistor switch and a low side transistor switch comprising:
    sensing an input voltage;
    sensing an output voltage; and,
    adjusting the off time $t_{OFF}$ of the high side switch so that $t_{OFF} = a1(V_{IN} - V_{OUT}) + a2$, where a1 and a2 are constants.

17. The method of claim 16 wherein the high side and low side transistor switches are discrete devices.

18. The method of claim 16 wherein the high side and low side transistor switches, together with a step down converter controller, are in a single integrated circuit.

19. The method of claim 16 wherein the high side transistor switch is a field effect transistor.

20. The method of claim 16 wherein the high side and low side transistor switches are field effect transistors.

\* \* \* \* \*